(12) United States Patent
Arora et al.

(10) Patent No.: US 8,836,865 B2
(45) Date of Patent: Sep. 16, 2014

(54) METHOD AND SYSTEM FOR APPLYING CONTENT-BASED PICTURE QUALITY PROFILES

(75) Inventors: Gaurav Arora, Northborough, MA (US); Adil Jagmag, Hollis, NH (US)

(73) Assignee: Broadcom Corporation, Irvine, CA (US)

( * ) Notice: Subject to any disclaimer, the term of this patent is extended or adjusted under 35 U.S.C. 154(b) by 714 days.

(21) Appl. No.: 13/013,299

(22) Filed: Jan. 25, 2011

(65) Prior Publication Data

US 2012/0019726 A1  Jan. 26, 2012

Related U.S. Application Data

(60) Provisional application No. 61/366,361, filed on Jul. 21, 2010.

(51) Int. Cl.
| | |
|---|---|
| H04N 5/14 | (2006.01) |
| H04N 21/84 | (2011.01) |
| H04N 21/442 | (2011.01) |
| H04N 21/6547 | (2011.01) |
| H04N 21/422 | (2011.01) |
| H04N 21/44 | (2011.01) |
| H04N 21/6587 | (2011.01) |
| H04N 5/21 | (2006.01) |
| H04N 5/58 | (2006.01) |

(52) U.S. Cl.
CPC ......... *H04N 21/84* (2013.01); *H04N 21/44209* (2013.01); *H04N 5/142* (2013.01); *H04N 21/6547* (2013.01); *H04N 21/42202* (2013.01); *H04N 5/21* (2013.01); *H04N 21/44* (2013.01); *H04N 5/58* (2013.01); *H04N 21/6587* (2013.01)
USPC .......................................................... 348/673

(58) Field of Classification Search
None
See application file for complete search history.

(56) References Cited

U.S. PATENT DOCUMENTS

2006/0197875 A1* 9/2006 Muto et al. ..................... 348/581
2010/0271390 A1* 10/2010 Tran et al. ...................... 345/619

* cited by examiner

*Primary Examiner* — Nicholas Corbo
(74) *Attorney, Agent, or Firm* — Foley & Lardner LLP; Christopher J. McKenna; Daniel Rose

(57) ABSTRACT

A method and system are provided in which a video channel is selected from multiple video channels in a video processor. A picture quality profile associated with a content of the selected video channel is received by the video processor to modify a value of one or more picture quality control parameters utilized by the video processor that are mapped to a user level setting. Metadata associated with the content of the selected video channel may be determined and communicated to a server. The server may utilize the metadata to determine a picture quality profile for the video processor. In some instances, environmental conditions associated with a television or display device may be measured and communicated to the server to determine the picture quality profile. For example, the measured environmental conditions may comprise one or more of an ambient light, a sound, a motion, and a temperature measurement.

20 Claims, 14 Drawing Sheets

| SETTINGS | SD_LOW | SD_MED | SD_HIGH | HD_LOW | HD_MED | HD_HIGH | ATV_LOW | ATV_MED | ATV_HIGH |
|---|---|---|---|---|---|---|---|---|---|
| NR level | 1 | 2 | 3 | 1 | 2 | 3 | 1 | 2 | 3 |
| ANR level | -21 | -7 | 7 | -24 | -9 | 7 | -17 | -5 | 7 |
| MNR level | -85 | -75 | -65 | -85 | -75 | -65 | -85 | -75 | -65 |
| BNR level | -85 | -75 | -65 | -85 | -75 | -65 | -85 | -75 | -65 |
| DCR level | -90 | -80 | -70 | -90 | -80 | -70 | -85 | -75 | -65 |

← PICTURE QUALITY CONTROL PARAMETERS →

USER LEVEL NOISE REDUCTION SETTINGS

| SETTINGS | RF Analog | RF SD | RF 720P | RF 1080I_P | CVBS | SVIDEO | YPBPR SD | YPBPR 720P | YPBPR 1080I_P |
|---|---|---|---|---|---|---|---|---|---|
| Brightness | 140 | 140 | 140 | 155 | 0 | 200 | 160 | 160 | 160 |
| Contrast | 185 | -245 | -250 | -260 | 160 | 155 | -580 | -580 | -580 |
| Saturation | 3797 | 3200 | 3200 | 3200 | 0 | 2500 | 3200 | 3200 | 3200 |
| Tint | -100 | 0 | 0 | 0 | 0 | 0 | 0 | 0 | 0 |
| Backlight | 49500 | 49500 | 49500 | 49500 | 49500 | 49500 | 49500 | 49500 | 49500 |
| Sharpness | 8 | 8 | 8 | 8 | 8 | 8 | 8 | 8 | 8 |
| Color temperature | 1 | 1 | 1 | 1 | 1 | 1 | 1 | 1 | 1 |
| Adaptive luma | 2 | 2 | 2 | 2 | 2 | 2 | 2 | 2 | 2 |
| Color enhancement | 1 | 1 | 1 | 1 | 1 | 1 | 1 | 1 | 1 |

Fig. 4A

400 — USER LEVEL DEFAULT SETTINGS / PICTURE QUALITY CONTROL PARAMETERS

| SETTINGS | Custom YUV | Cool YUV | Computer YUV | Normal YUV | 6500 RGB | 9300 RGB | Custom RGB |
|---|---|---|---|---|---|---|---|
| rGain | 2048 | 2048 | 2048 | 2048 | 2048 | 2048 | 2048 |
| gGrain | 2048 | 2048 | 2048 | 2048 | 2048 | 2048 | 2048 |
| bGain | 2048 | 2048 | 2048 | 2048 | 2048 | 2048 | 2048 |
| rOffset | 0 | 0 | 0 | 0 | 0 | 0 | 0 |
| gOffset | 0 | 0 | 0 | 0 | 0 | 0 | 0 |
| bOffset | 0 | 0 | 0 | 0 | 0 | 0 | 0 |
| Gamma_idx | 3 | 0 | 1 | 2 | 2 | 1 | 3 |

500 — USER LEVEL COLOR TEMPERATURE SETTINGS / PICTURE QUALITY CONTROL PARAMETERS

Fig. 5

| SETTINGS | logic_min | logic_mid | logic_max | phy_min | phy_mid | phy_max |
|---|---|---|---|---|---|---|
| Tint | -32 | 0 | 32 | -3641 | 0 | 3641 |
| Contrast | 0 | 50 | 100 | -19024 | -200 | 10923 |
| Saturation | 0 | 50 | 100 | -32768 | 2300 | 30000 |
| Brightness | 0 | 50 | 100 | -8192 | 100 | 8192 |
| Backlight | 0 | 50 | 100 | 0 | 28125 | 56250 |
| Sharpness | 0 | 8 | 16 | -32768 | 0 | 32767 |
| Rgain | 0 | 128 | 255 | 0 | 2048 | 4096 |
| Ggain | 0 | 128 | 255 | 0 | 2048 | 4096 |
| Bgain | 0 | 128 | 255 | 0 | 2048 | 4096 |
| Roffset | 0 | 128 | 255 | -32768 | 0 | 32767 |
| Goffset | 0 | 128 | 255 | -32768 | 0 | 32767 |
| Boffset | 0 | 128 | 255 | -32768 | 0 | 32767 |

USER LEVEL PICTURE RANGE SETTINGS

PICTURE QUALITY CONTROL PARAMETERS

METHOD AND SYSTEM FOR APPLYING CONTENT-BASED PICTURE QUALITY PROFILES

CROSS-REFERENCE TO RELATED APPLICATIONS/INCORPORATION BY REFERENCE

This application claims priority to and makes reference to U.S. Provisional Patent Application Ser. No. 61/366,361 filed on Jul. 21, 2010.

The above stated application is hereby incorporated herein by reference in its entirety.

FIELD OF THE INVENTION

Certain embodiments of the invention relate to processing of video signals. More specifically, certain embodiments of the invention relate to a method and system for applying content-based picture quality profiles.

BACKGROUND OF THE INVENTION

A typical television today may support customized tuning or setting or picture quality parameters utilized in the operation of the television. The tuning or setting may be different for each type of television, sources of content to be used with the televisions, and/or the television manufacturer. Moreover, the tuning or setting is generally done at the factory and does not change over the lifetime of the television.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for applying content-based picture quality profiles, as set forth more completely in the claims.

Various advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 3 is a table that illustrates a picture quality profile mapping of user level noise reduction settings to device level picture quality control parameters, in accordance with an embodiment of the invention.

FIGS. 4A and 4B are each a table that illustrates exemplary picture quality profile mapping of user level default settings to device level picture quality control parameters, in accordance with an embodiment of the invention.

FIG. 5 is a table that illustrates a picture quality profile mapping of user level color temperature settings to device level picture quality control parameters, in accordance with an embodiment of the invention.

FIG. 6 is a table that illustrates a picture quality profile mapping of user level picture ranges settings to device level picture quality control parameters, in accordance with an embodiment of the invention.

DETAILED DESCRIPTION OF THE INVENTION

Figure 1:
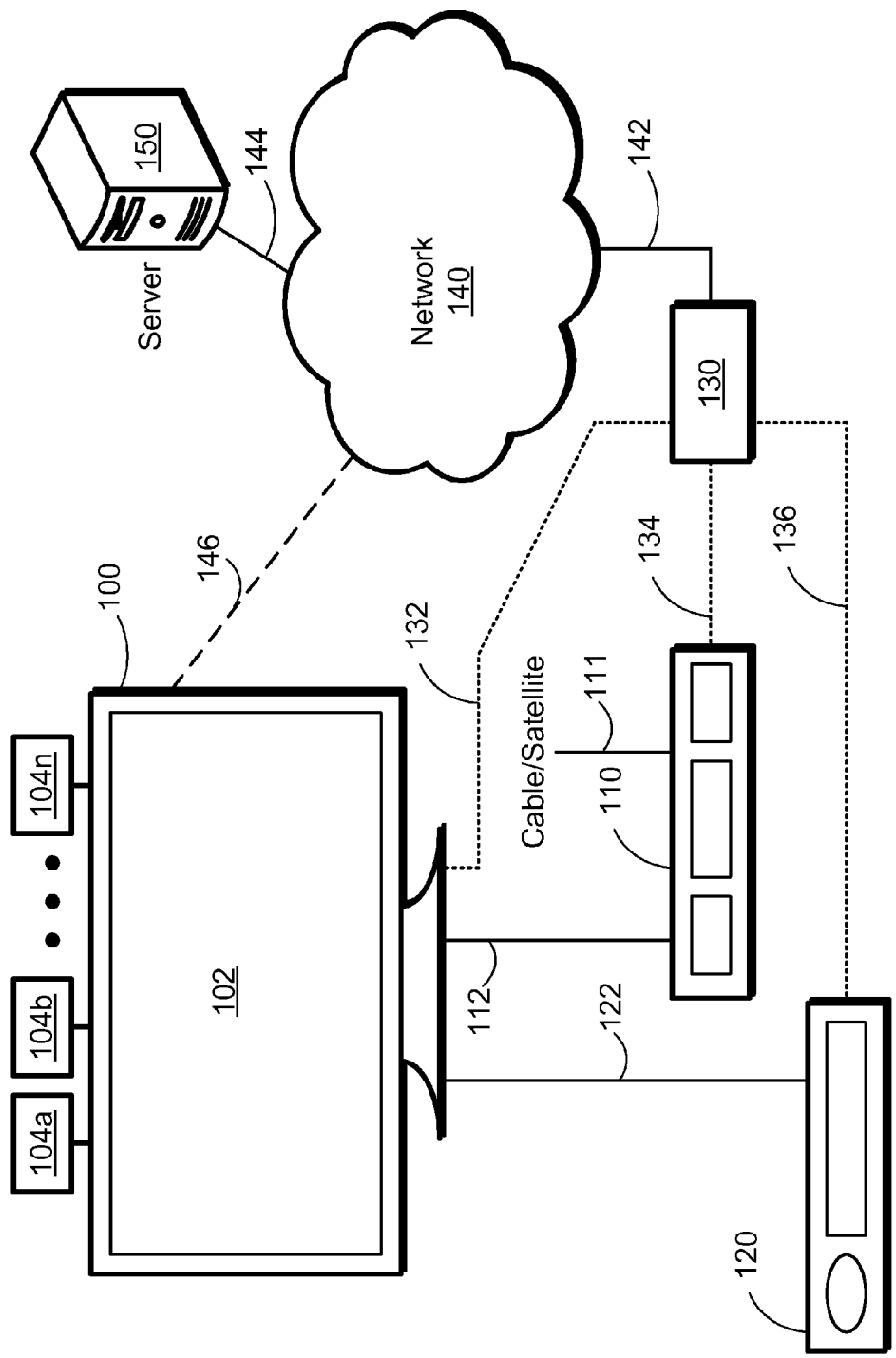
FIG. 1 is a block diagram of an exemplary system for delivering multiple video signals to a display unit, in accordance with embodiments of the invention.

Certain embodiments of the invention can be found in a method and system for applying content-based picture quality profiles. Various embodiments of the invention provide for selection of a video channel of a plurality of video channels that may be available to a video processor. The video processor may be integrated within a television, display unit, or other video processing device. The video processor may receive a picture quality profile associated with a content of the selected video channel. The picture quality profile may comprise a mapping of, for example, logical or user level settings to physical or device level picture quality control parameters that are utilized for processing of the video signals. The video processor may modify, based on the received picture quality profile, a value of one or more of the picture quality control parameters utilized by the video processor that are mapped to a user level setting. Moreover, the video processor may modify the mapping between the user level setting and the picture quality control parameters.

The picture quality profile associated with the content of the selected video channel may be received from a server. For example, when a user or viewer tunes to a particular video channel or video signal, the television or display unit may communicate with a website or server. The television may determine whether the content being watched by the user has dynamic picture quality profiles associated with it and when such dynamic picture quality profiles are available, the television may proceed to download a content-based picture quality profile from the server. The server may be associated with, for example, the manufacturer of the television or display unit and/or with an approved third party. In this manner, one or more picture quality profiles may be dynamically downloaded to the video processor in the television or display unit from the server during the viewing of a particular program or service associated with the selected video channel. That is, device level picture quality control parameters in the video processor that may be utilized to handle brightness, sharpness, tint, sound, contrast, saturation, color temperature, backlight, and/or noise reduction operations, for example, may be dynamically varied by receiving one or more picture quality profiles during the viewing of certain programming.

In an embodiment of the invention, environmental conditions associated with a television or display unit may be measured and sent to, for example, the video processor. The television may comprise one or more built-in sensors to make the measurements. The television may then communicate the measured environmental conditions to the server. The picture quality profile associated with the content of the selected video channel may be determined and/or selected by the server based on the measured environmental conditions that it receives. In some instances, the video processor in the television or display unit may receive the measured environmental conditions and may be utilized to communicate such measurements to the server. The measured environmental conditions may comprise one or more of an ambient light measurement, a sound measurement, a motion measurement, and a temperature measurement. The video processor may also determine metadata associated with the content of the selected video channel and may communicate the determined metadata to the server. The picture quality profile associated with the content of the selected video channel may be determined, created, and/or selected by the server based on the determined metadata. In other words, the server may utilize one or both of measured environmental conditions and metadata associated with the content of the selected video channel for determining, creating, and/or selecting a picture quality profile.

When a change is detected by the video processor in the content of the selected video channel, for example, in the content of the programming being provided through the selected video channel, a subsequent picture quality profile associated with the detected content change of the selected video channel may be received by the video processor. The video processor may modify, based on the received subsequent picture quality profile, a value of one or more picture quality control parameters utilized by the video processor that are mapped to the user level setting. Moreover, the video processor may modify, based on the received subsequent picture quality profile, the mapping of the user level setting to the picture quality controls.

In an embodiment of the invention, the user level setting in a picture quality profile may comprise a user level noise reduction setting. The picture quality control parameters utilized by the video processor that are mapped to the user level noise reduction setting may comprise one or more of an analog noise reduction level, a block noise reduction level, a mosquito noise reduction level, and a digital contour reduction level, for example. In an embodiment of the invention, the user level setting in a picture quality profile may comprise a user level preset setting. The picture quality control parameters utilized by the video processor that are mapped to the user level preset setting may comprise one or more of a brightness level, a contrast level, a saturation level, a tint level, a backlight level, a sharpness level, a luma level, and a color enhancement level, for example.

As described above, the picture quality parameters or controls of a video processor may be dynamically modified based on the contents of a particular video channel. For example, the creator of the content, such as the director of a movie, may have a particular vision of how to present the content and/or what the user or viewer experience should be for that particular content. Accordingly, the picture quality parameters or controls that are utilized when processing the content may be modified or varied dynamically while the user or viewer is watching the content. Additional details regarding the dynamic application of content-based picture quality profiles are provided with respect to the various embodiments of the invention described below.

FIG. 1A is a block diagram of an exemplary system for delivering multiple video signals to a display unit, in accordance with an embodiment of the invention. Referring to FIG. 1, there is shown a display unit 100, a set-top-box 110, a DVR 120, and a network interface device 130. Also shown in FIG. 1 are a network 140 and a server 150.

The display unit 100 may comprise suitable logic, circuitry, code, and/or interfaces that may be operable to receive video signals from one or more sources and to process the received video signals. In this regard, the display unit 100 may be operable to process the video image data and/or the audio data video comprised within such video signals. The display unit 100 may process the video image data to display the video images associated with the processed video image data and may process the audio data to reproduce the audio or sound associated with the processed audio data. The video image data and the audio data may be combined within the video signal or may be separate within the video signal, such as when carried by separate signals within the video signal, for example.

The display unit 100 may comprise a visual display or screen 102 that may be operable to display the video images associated with the video image data processed by the display unit 100. The screen 102 may be based on a display technology such as cathode ray tubes (CRTs), liquid crystal displays (LCDs), plasma display panels (PDPs), thin film transistor LCDs (TFT-LCDs), plasma, light emitting diode (LED), organic LED (OLED), or other flatscreen display technology, for example. The screen 102 may support one or more aspect ratios when displaying video images such as a 4:3 standard aspect ratio and a 16:9 high-definition or widescreen aspect ratio, for example. The display unit 100 may comprise one or more speakers (not shown) and/or may be communicatively coupled to one or more speakers (not shown), wherein the speakers may be utilized to reproduce the audio or sound associated with the audio data processed by the display unit 100.

While the display unit 100 may typically be a television, the invention need not be so limited. For example, the display unit 100 may be a monitor, a handheld device, a portable device, a stationary device, or other like device that is capable of receiving video signals from one or more sources, and processing and/or handling the video content associated with the received video signals. When the display unit 100 is a television, the display unit 100 may support multiple technical standards such as digital television (DTV) and high-definition television (HDTV), for example.

The display unit 100 may receive video signals from one or more sources. For example, the display unit 100 may receive video signals from traditional radio frequency broadcasts and/or may generate video signals from signals received through traditional radio frequency broadcasts. In another example, the display unit 100 may receive video signals from other sources such as the set-top-box 110, the DVR 120, and/or the network interface device 130. Each of the set-top-box 110, the DVR 120, and/or the network interface device 130 may provide one or more video signals to the display unit 100. The video signals received by the display unit 100 may be associated with different sources when provided by different devices and/or services, and/or when based on different formats, standards, and/or protocols.

The display unit 100 may comprise one or more processing devices (not shown) that may be operable to process the video image data and/or the audio data received by the display unit 100. For example, a processing device in the display unit 100 may process the video image data to display the video images associated with the video image data. Similarly, the same processing device, or another processing device in the display unit 100, may process the audio data to reproduce the audio or sound associated with the audio data. The processing device in the display unit 100 may be operable to select a video channel from among a plurality of video channels received by the display unit 100. The various video channels may be received by the display unit 100 through one or more of the video signals received by the display unit 100. The processing device may also receive a picture quality profile associated with a content of the selected video channel. In this regard, the picture quality profile may comprise a mapping of logical or user level settings to physical or device level picture quality control parameters. The picture quality control parameters are utilized by the processing device to process video image data and/or the audio data associated with the selected video channel. The processing device may modify, based on the received picture quality profile, a value of one or more of the picture quality control parameters that are mapped to a user level setting. Moreover, the processing device may modify the mapping between the user level setting and the picture quality control parameters. The processing device may be operable to determine metadata associated with the content of the selected video channel. Such metadata may be utilized for determining, selecting, and/or creating a picture quality profile to be utilized with the content of the selected video channel. Exemplary embodiments of such processing devices are described below with respect to FIGS. 2 and 3.

The display unit 100 may be operable to communicate with the server 150 via the network interface device 130 and the network 140. In this manner, the display unit 100 may request and receive picture quality profiles from the server 150, and/or may communicate metadata information associated with the content of a selected video channel to the server 150. Moreover, the display unit 100 may be operable to wirelessly communicate with the network 140 by utilizing a wireless protocol such as the worldwide interoperability for microwave access (WiMAX) communication protocol, for example. In this manner, Internet Protocol Television (IPTV) services, other network-based video content delivery services, and/or data or information other than video content may be provided to the display unit 100 via a wireless link 146. For example, the display unit 100 may communicate via the wireless link 146 and the network 140 with the server 150 to request and receive picture quality profiles from the sever 150, and/or to communicate metadata information associated with the content of a selected video channel to the server 150.

The display unit 100 may comprise a plurality of sensors 104a, 104b, . . . , 104n, which may be utilized to measure one or more environmental conditions related to the display unit 100. While some or all of the sensors may be integrated into the display unit 100 to monitor environmental conditions in close proximity to the display unit 100, some or all of the sensors may also be separate from the display unit 100 and located in the vicinity of the display unit 100 to be able to monitor environmental conditions over a wider area. When a sensor is separate from the display unit 100, the sensor may be communicatively coupled to the display unit 100 via a wired and/or wireless link. The environmental conditions measurements may be communicated to the server 150 via the network interface device 130 and the network 140 and/or via the wireless link 146 and the network 140, for example.

The set-top-box 110 may comprise suitable logic, circuitry, code, and/or interfaces that may be operable to receive signals from a cable or satellite operator that provides television services and/or other type of programming services. The set-top-box 110 may be operable to process the signals received from the operator to generate one or more video signals that may be communicated to the display unit 100. In this regard, the set-top-box 110 may receive signals from the cable operator or from a satellite antenna (not shown) via a link 111 and may communicate the video signals to the display unit 100 via a link 112. The links 111 and 112 may comprise, for example, suitable connectors, coaxial cables, wires, and/or optical fibers that enable wired communication to and/or from the set-top-box 110. In an embodiment of the invention, at least a portion of the link 111 and/or at least a portion of the link 112 may comprise a wireless communication link.

The DVR 120 may comprise suitable logic, circuitry, code, and/or interfaces that may be operable to digitally record and/or play back video content. For example, the DVR 120 may digitally record and/or play back video image data and/or audio data. The DVR 120 may support recording and/or play back operations in one or more formats that may include, but need not be limited to, a compact disc (CD) format, a digital video disc (DVD) format, and a Blu-ray Disc (BD) format, for example. The DVR 120 may utilize a memory medium, such as a disk drive, a universal serial bus (USB) flash drive, a non-volatile memory card (e.g., secure digital (SD) memory card), and/or other type of digital storage medium in which to digitally record and/or from which to play back video image data and/or audio data. In some embodiments of the invention, the DVR 120 may be a portable device or an application for a personal computer that enables capturing, storing, and/or playing back video image data and/or audio data. When in a play back mode of operation, the DVR 120 may generate one or more video signals that may be communicated to the display unit 100 via a link 122. The link 112 may comprise, for example, suitable connectors, coaxial cables, wires, and/or optical fibers that enable wired communication between the DVR 120 and the display unit 100. In an embodiment of the invention, at least a portion of the link 122 may comprise a wireless communication link.

In an embodiment of the invention, some or all of the functions or operations supported by the DVR 120 may be implemented in the set-top-box 110. For example, the set-top-box 110 may receive one or more signals from the cable or satellite operator and may digitally record video content associated with the received signals. The set-top-box 110 may also play back the digitally recorded video content to generate video signals that are communicated to the display unit 100.

In another embodiment of the invention, some or all of the functions or operations supported by the DVR 120 and some or all of the functions or operations supported by the set-top-box 110 may be implemented in the display unit 100. That is, the display unit 100 may receive video signals from the cable or satellite operator, or may generate video signals from signals received from the cable or satellite operator. Moreover, the display unit 100 may digitally record video content associated with the received signals. In this regard, the display unit 100 may play back the digitally recorded video content, display the video images associated with the video content, and/or reproduce the audio or sound associated with the video content.

The network interface device 130 may comprise suitable logic, circuitry, code, and/or interfaces that may be operable to communicatively couple one or more devices to the network 140. The network 140 may be the Internet or other wide area network (WAN), for example. The network interface device 130 may be communicatively coupled to one or more of the display unit 100, the set-top-box 110, and the DVR 120 via links 132, 134, and 136, respectively. Each of the links 132, 134, and 136 may support wired and/or wireless communication between the network interface device 130 and the display unit 100, the set-top-box 110, and the DVR 120.

In an embodiment of the invention, the network interface device 130 may be a residential gateway that may comprise suitable hardware and/or software to provide some or all of the functions and/or operations of one or more of a modem (e.g., digital subscribed line (DSL) modem, cable modem, wireless cable modem), a router (e.g., wireless router), and a switch (e.g., network switch, local area network (LAN) switch).

The network interface device 130 may be utilized to provide IPTV services and/or other network-based video content delivery services to one or more of the display unit 100, the set-top-box 110, and the DVR 120 via the links 132, 134, and 136, respectively. The network interface device 130 may provide video signals to the display unit 100 in connection with the IPTV services and/or the network-based video content delivery services. Moreover, the network interface device 130 may provide signals to the set-top-box 110 and/or to the DVR 120 that may be utilized by those devices to generate video signals that may be communicated to the display unit 100 for processing. The network interface device 130 may be communicatively coupled to the network 140 via a link 142, which may support wired and/or wireless communication between the network interface device 130 and the network 140. The network interface device 130 may also be operable to communicate to the server 150, via the network 140, requests for picture quality profiles, metadata associated with the content of a video channel selected by the display unit 100, and/or measurements of environmental conditions performed by the sensors 104a, 104b, . . . , 104n. The server 150 may communicate one or more picture quality profiles to the display unit 100 via the network interface device 130.

The server 150 may comprise suitable logic, circuitry, code, and/or interfaces that may be operable to provide video content through IPTV services and/or other network-based video delivery services. The server 150 may also provide, via the network interface device 130, data or information, other than video content, to the display unit 100, the set-top-box 110, and/or the DVR 120. For example, the server 150 may provide picture quality profiles that may be utilized to configure one or more processing devices in the display unit 100. In this regard, the server 150 may be operable to determine, select, and/or create a picture quality profile based on one or both of metadata associated with the content of a selected video channel and measured environmental conditions. In an embodiment of the invention, the server 150 may have stored one or more picture quality profiles and may determine or select a picture quality profile from those stored. In another embodiment of the invention, the server 150 may generate a picture quality profile based on the metadata and/or measured environmental conditions received. The server 150 may be communicatively coupled to the network 140 via a link 144, which may support wired and/or wireless communication between the server 150 and the network 140.

While a single server 150 is shown in FIG. 1, the invention need not be so limited. For example, multiple servers may be utilized for the delivery of video content to the display unit 100, the set-top-box 110, and/or the DVR 120 via the network interface device 130. In another example, one or more servers may be utilized for the delivery of data or information other than video content to the display unit 100, the set-top-box 110, and/or the DVR 120 via the network interface device 130. In this regard, one or more servers may be utilized for the delivery of picture quality profiles to the display unit 100.

Figure 2:
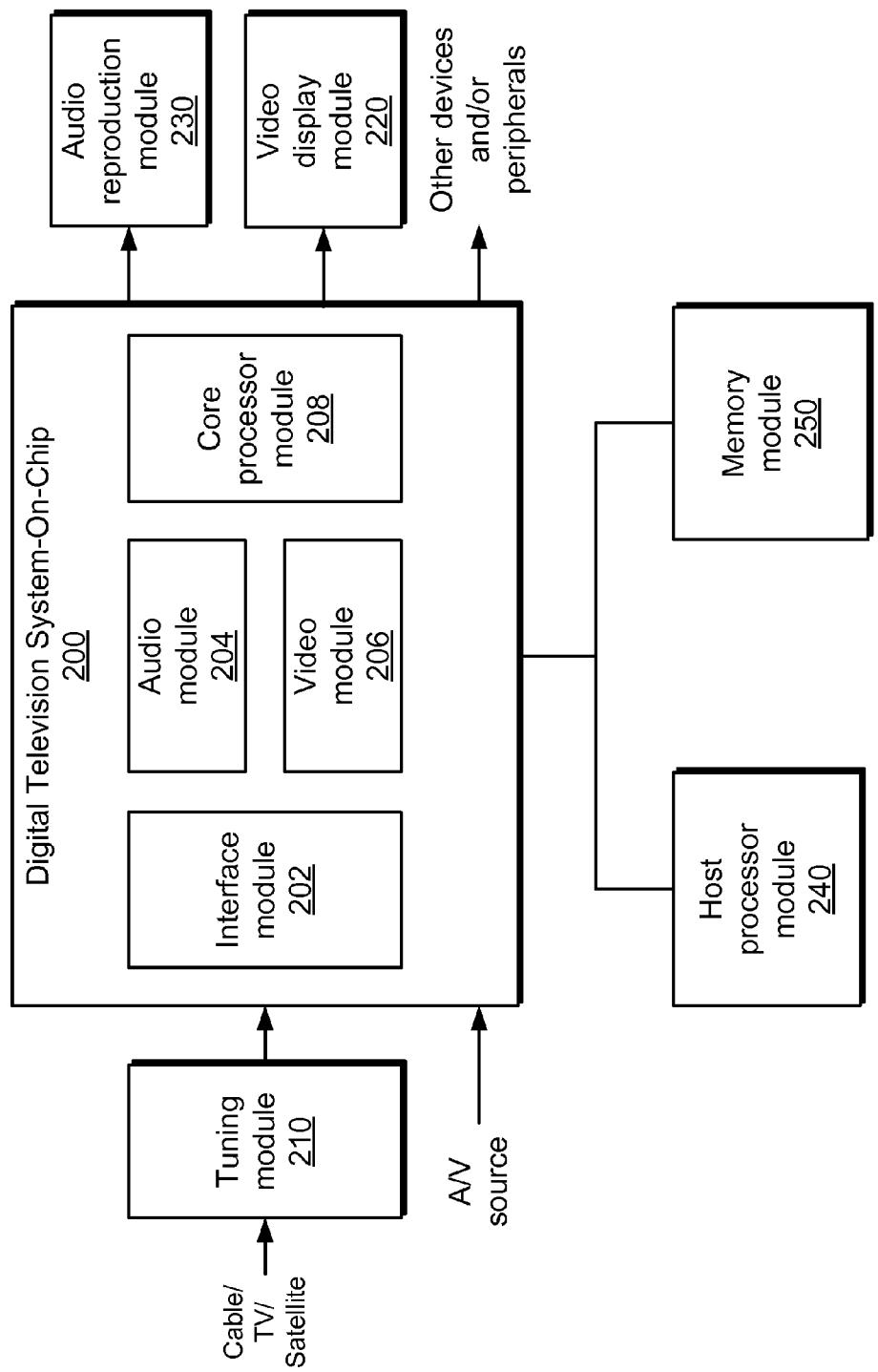
FIG. 2 is a block diagram illustrating an exemplary system for processing video image data and audio data in a display unit, in accordance with an embodiment of the invention.

FIG. 2 is a block diagram illustrating an exemplary system for processing video image data and audio data in a display unit, in accordance with an embodiment of the invention. Referring to FIG. 2, there is shown a digital television system-on-chip (DTV SoC) 200, a video display module 220, an audio reproduction module 230, a host processor module 240, and a memory module 250.

The DTV SoC 200 may comprise suitable logic, circuitry, code, and/or interfaces that may be operable to receive and process one or more video signals that comprise video content. Examples of video signals that may be received and processed by the DTV SoC 200 include, but need not be limited to, a CVBS signal, an S-video signal, a High-Definition Multimedia Interface (HDMI) signal, a component signal, a PC signal, an SIF signal, and an RGB signal. The video source signals may be received from a tuning module 210 and/or from one or more audio/visual (NV) sources. The video signals received by the DTV SoC 200 may include image signals that comprise video image data and/or audio signals that comprise audio data.

The processing of a video signal by the DTV SoC 200 may comprise dynamically modifying, adjusting, and/or controlling, based on a picture quality profile received by the DTV SoC 200, a value of one or more of the physical or device level picture quality control parameters utilized by the DTV SoC 200. The picture quality profile may be based on the contents of a video channel selected and processed by the DTV SoC 200. Moreover, the DTV SoC 200 may dynamically modify, adjust, and/or control a mapping between the user level setting and the picture quality control parameters based on the picture quality profile received. In this regard, the DTV SoC 200 may have a default or factory-programmed picture quality profile that may be replaced by a picture quality profile received during the viewing of the programming associated with the selected video channel. The DTV SoC 200 may be operable to determine metadata information associated with a content of the selected video channel. The metadata that may be utilized to determine, select, and/or generate a picture quality profile. The DTV SoC 200 may also be operable to receive, process, and/or send measured environmental conditions that may be utilized to determine, select, and/or generate a picture quality profile.

The processing of a video signal by the DTV SoC 200 may comprise various operations such as display control operations, scaling operations, picture enhancement operations, digital noise reduction operations, analog noise reduction operations, letterbox detection operations, video capture and feeding operations, and/or video bypass and routing operations. The DTV SoC 200 need not be so limited and other operations associated processing a video signal may also be performed.

The display control operations supported by the DTV SoC 200 may comprise configuring DTV SoC 200 to support multiple display output formats. In this regard, the data transfer in the DTV SoC 200 may be controlled utilizing a self-regulating data flow control mechanism. The scaling operations supported by the DTV SoC 200 may comprise two-dimensional scaling, including standard definition (SD) scaling, high-definition (HD) scaling, and/or non-linear horizontal scaling with multiple scaling regions in which the side regions may utilize a higher-order difference equation for the scale factor. The DTV SoC 200 may also support video image cropping. The scaling operations may utilize separate luma and chroma coefficients, for example.

The picture enhancement operations supported by DTV SoC 200 may comprise adjustments to the color space, sharpness, and brightness of the video images to improve image quality. Such improvements in image quality may be utilized in connection with various functions that may include, but need not be limited to, auto-flesh, green boost, soft saturate luma, black stretch adjustment, histogram equalization, blue shift, and sharpness improvement. The picture enhancement operations may also enable three-dimensional (3D) color management adjustments over various regions of a video image based on luma-chroma or hue-saturation coordinates, for example. Within each of these regions, both luma and chroma adjustments may be possible. The picture enhancement operations may comprise modifying, adjusting, and/or controlling a mapping and/or values in picture quality profile. In an embodiment of the invention, the picture quality control parameters utilized by the DTV SoC 200 in connection with a user level preset may comprise one or more of a brightness level, a contrast level, a saturation level, a tint level, a backlight level, a sharpness level, a luma level, and a color enhancement level, for example The digital noise reduction (DNR) operations supported by the DTV SoC 200 may comprise adaptive block noise reduction and adaptive mosquito noise reduction. In some embodiments of the invention, the digital noise reduction operations may be applied before scaling or de-interlacing operations. The digital noise reduction operations may be applied to video image data in various formats, such as MPEG or Advanced Video Coding (AVC) formats, for example, and in various resolutions, including SD and HD, for example. The DNR operations may comprise modifying, adjusting, and/or controlling a mapping and/or values in picture quality profile. The analog noise reduction (ANR) operations supported by DTV SoC 200 may comprise reduction of random noise that may be result from the external video source. For example, the analog noise reduction operations may include, but need not be limited to, motion detection, edge detection, and adaptive temporal filter that are utilized to reduce random noise. The ANR operations may comprise modifying, adjusting, and/or controlling a mapping and/or values in picture quality profile. In an embodiment of the invention, the picture quality control parameters utilized by the DTV SoC 200 in connection with a user level noise reduction setting may comprise one or more of an analog noise reduction level, a block noise reduction level, a mosquito noise reduction level, and a digital contour reduction level, for example.

The letterbox detection operation supported by the DTV SoC 200 may comprise aspect ratio detection, black line detection, and black column detection. In this regard, the letterbox detection operation may support letterbox format detection, pillarbox format detection, and postage-stamp format detection. When a video image has an ambiguous format, whether because the video image is mostly black or has excessive noise, the letterbox detection operation may consider or treat such a video image as being letterbox formatted. The letterbox detection operation need not change the formatting of the video images automatically, but may do so based on different usage models and/or user input.

The video capture operations supported by the DTV SoC 200 may comprise receiving video image data from one or more modules within the DTV SoC 200, formatting the video image data and sending the video image data to memory, such as a Dynamic Random Access Memory (DRAM) external to the DTV SoC 200. Exemplary formatting of the video image data may comprise down-sampling rounding and/or truncation. The video feeding operations supported by the DTV SoC 200 may comprise receiving video image data from memory external to the DTV SoC 200, formatting the video image data (e.g., up-sampling), and sending the video image data to one or more modules within the DTV SoC 200 for processing.

The video display module 220 may comprise suitable logic, circuitry, code, and/or interfaces that may be operable to receive one or more signals comprising processed video image data from the DTV SoC 200 and to display the video images associated with the processed video image data received. In this regard, the video display module 220 may correspond to a screen such as the screen 102 of the display unit 100 described above with respect to FIG. 1. The audio reproduction module 230 may comprise suitable logic, circuitry, code, and/or interfaces that may be operable to receive one or more signals from the DTV SoC 200 comprising processed audio data and to reproduce the audio or sound associated with the processed audio data received. In this regard, the audio reproduction module 230 may correspond to one or more speakers of the display unit 100 and/or to one or more speakers communicatively coupled to the display unit 100.

The host processor module 240 may comprise suitable logic, circuitry, code, and/or interfaces that may be operable to control and/or configure the operation of the DTV SoC 200. For example, the host processor module 240 may be utilized to provide user-based instructions and/or other instructions to the DTV SoC 200. The memory module 250 may comprise suitable logic, circuitry, code, and/or interfaces that may be operable to store information associated with the operation of the DTV SoC 200. For example, the memory module 250 may store intermediate values associated with the processing of video image data and/or audio data by the DTV SoC 200. Moreover, the memory module 250 may be utilized to store information associated with picture quality profiles, metadata, and/or measured environmental conditions received by the DTV SoC 200 and/or processed by the DTV SoC 200.

The tuning module 210 may comprise suitable logic, circuitry, code, and/or interfaces that may be operable to tune in to a video signal and/or other signal received from one or more sources. For example, the tuning module 210 may be utilized to tune to a video signal and/or other signal received from a radio frequency broadcast and/or from a set-top-box. The tuning module 210 may be utilized to tune in to more than one signal. In some embodiments of the invention, the tuning module 210 may be integrated within the DTV SoC 200. In this regard, the DTV SoC 200 may receive video signals from various audio/video (A/V) sources from such sources without the need for an external tuner.

The DTV SoC 200 may comprise an interface module 202, an audio module 204, a video module 206, and a core processor module 208. The interface module 202 may comprise suitable logic, circuitry, code, and/or interfaces that may be operable to receive, process, and/or select between multiple video signals received by the DTV SoC 200. For example, the interface module 202 may be utilized to switch between a current video signal being processed by the DTV SoC 200 and another or a next video signal being processed by the DTV SoC 200. In this regard, the interface module 202 may comprise one or more switches (not shown) and/or one or more multiplexers (not shown) to enable the interface module 202 to select one of the multiple video signals that may be received by the DTV SoC 200. The interface module 202 may be utilized to select a video channel of a plurality of video channels received by the DTV SoC 200 through one or more of the video signals.

The audio module 204 may comprise suitable logic, circuitry, code, and/or interfaces that may be operable to process audio data associated with one or more video signals. In this regard, the audio module 204 may be operable to support processing of audio data in more than one format. The video module 206 may comprise suitable logic, circuitry, code, and/or interfaces that may be operable to process video image data associated with one or more video signals. The video module 206 may be operable to perform various operations associated with picture enhancement, including the application of content-based picture quality profiles.

The core processor module 208 may comprise suitable logic, circuitry, code, and/or interfaces that may be operable to control and/or configure the operation of the DTV SoC 200. For example, the core processor module 208 may be operable to control and/or configure operations of the DTV SoC 200 that are associated with fast source switching and/or with automatic source switching.

In operation, the DTV SoC 200 may receive multiple video signals from one or more sources such as radio frequency broadcasts, cable television services, satellite television services, IPTV services, and/or DVR or personal video recorder (PVR) playback, for example. The interface module 202 of the DTV SoC 200 may select a video channel of a plurality of video channels that may be available to the DTV SoC 200 via the various received video signals. The DTV SoC 200 may receive a picture quality profile associated with a content of the selected video channel. The picture quality profile may be received in response to a request generated by the DTV SoC 200, for example. The host processor module 240 and/or the core processor module 208 of the DTV SoC 200 may modify, based on the received picture quality profile, a value of one or more of the physical or device level picture quality control parameters utilized by the audio module 204 and/or the video module 206 of DTV SoC 200. Moreover, the host processor module 240 and/or the core processor module 208 may dynamically modify a mapping between the user level setting and the picture quality control parameters based on the received picture quality profile. The picture quality control parameters may be utilized in the DTV SoC 200 to handle, for example, audio, brightness, sharpness, tint, sound, contrast, saturation, color temperature, backlight, and/or noise reduction operations, for example.

The DTV SoC 200 may receive, process, and/or format measured environmental conditions for communication to a server, such as the server 150 described above with respect to FIG. 1. The measured environmental conditions may comprise one or more of an ambient light measurement, a sound measurement, a motion measurement, and a temperature measurement. The audio module 204, the video module 206, and/or the core processor module 208 of the DTV SoC 200 may be utilized to determine metadata associated with the content of the selected video channel and may be utilized to communicate the determined metadata to a server.

When a change is detected in the content of the selected video channel by the audio module 204, the video module 206, and/or the core processor module 208 of the DTV SoC 200, a subsequent picture quality profile associated with the detected content change of the selected video channel may be received by the DTV SoC 200. A value of one or more picture quality control parameters utilized by the audio module 204 and/or the video module 206 may be modified based on the received subsequent picture quality profile. Moreover, based on the received subsequent picture quality profile, a mapping of the user level setting to the picture quality control parameters may also be modified.

FIG. 3 is a table that illustrates a picture quality profile mapping of a user level noise reduction setting to device level picture quality control parameters, in accordance with an embodiment of the invention. Referring to FIG. 3, there is shown a table 300 for user level noise reduction settings. A user level noise reduction setting may refer to a logical setting that a user may be able to control or set for the operation of, for example, a television or display unit. For example, the television or display unit may provide a graphical user interface (GUI) that allows a user or viewer to adjust or control the user level noise reduction setting. In some instances, such adjustment or control may be provided through a scale and/or a set of operating modes that are accessible to the user via the GUI, for example. In this manner, the user may be able to select a particular point in the scale and/or a particular operating mode that provides the appropriate or desired viewing experience.

Referring back to FIG. 3, the user level noise reduction settings may comprise a plurality of user level settings or operating modes as illustrated in the top row of the table 300. For example, the DTV SoC 200 may be utilized to select one or more of the following settings as the user level noise reduction setting: a standard definition (SD) low noise reduction(SD LOW), an SD medium noise reduction (SD MED),an SD high noise reduction (SD_HIGH), a high-definition(HD) low noise reduction (HD_LOW), an HD medium noise reduction (HD_MED), an HD high noise reduction (HD_HIGH), an analog television (ATV) low noise reduction(ATV LOW), an ATV medium noise reduction (ATV MED), and an ATV high noise reduction (ATV HIGH).

For each of the settings described above, the DTV SoC 200 may have one or more associated physical or device level picture quality control parameters. Each of these picture quality control parameters may be set to a particular or default value during manufacturing or during the initial configuration of the DTV SoC 200. As shown in table 300, each of the settings described above is associated with the following picture quality control parameters of the DTV SoC 200: a noise reduction (NR) level, an analog noise reduction (ANR) level, a mosquito noise reduction (MNR) level, a block noise reduction (BNR) level, and a digital contour noise reduction (DCR) level. As indicated above, the values of the picture quality control parameters typically remain set after manufacturing or after the initial configuration of the DTV SoC 200. For example, whether by user selection or as a default value, whenever the SD_LOW setting is selected, the ANR level value may be −21. The DTV SoC 200, however, may be operable to have such set value dynamically modified, adjusted, and/or controlled based on having a picture quality profile received by the DTV SoC 200. Moreover, the DTV SoC 200 may be operable to dynamically modify, adjust, and/or control which of the various picture quality control parameters are mapped to the various user level noise reduction settings shown in table 300. Additional details regarding the dynamic modification, adjustment, and/or control of the values and/or mapping of the picture quality control parameters to, for example, the user level noise reduction settings, are provided below in connection with at least FIGS. 7A-10.

FIG. 4A is a table that illustrates a picture quality profile mapping of user level default settings to device level picture quality control parameters, in accordance with an embodiment of the invention. Referring to FIG. 4A, there is shown a table 400 for user level default settings. A user level default setting may refer to a logical setting that is initially provided and that a user may be able to control or set for the operation of a television or display unit based on the type of source of the video content. The user level default settings may comprise a plurality of user level settings or operating modes as illustrated in the top row of the table 400. For example, a user or manufacturer may be able to select one or more of the following settings as the user level default setting: a radio frequency (RF) analog source, an RF SD source, an RF 720P source, an RF 1080I_P source, a CVBS source, an S-Video source, a composite or YPbPr 720P source, and a YPbPr 1080I_P source.

For each of the settings described above, the DTV SoC 200 may have one or more associated physical or device level picture quality control parameters. Each of these picture quality control parameters may be set to a particular or default value during manufacturing or during the initial configuration of the DTV SoC 200. As shown in table 400, each of the settings described above is associated with the following picture quality control parameters of the DTV SoC 200: brightness, contrast, saturation, tint, backlight, sharpness, color temperature, adaptive luma, and color enhancement. As indicated above, the values of the picture quality control parameters typically remain set after manufacturing or during the initial configuration of the DTV SoC 200. For example, any time the CVBS source setting is selected, the contrast value is 160. The DTV SoC 200, however, may be operable to have such set value dynamically modified, adjusted, and/or controlled based on having a picture quality profile received by the DTV SoC 200. Moreover, the DTV SoC 200 may be operable to dynamically modify, adjust, and/or control which of the various picture quality control parameters are mapped to the various user level default settings shown in table 400.

Figure 4B:
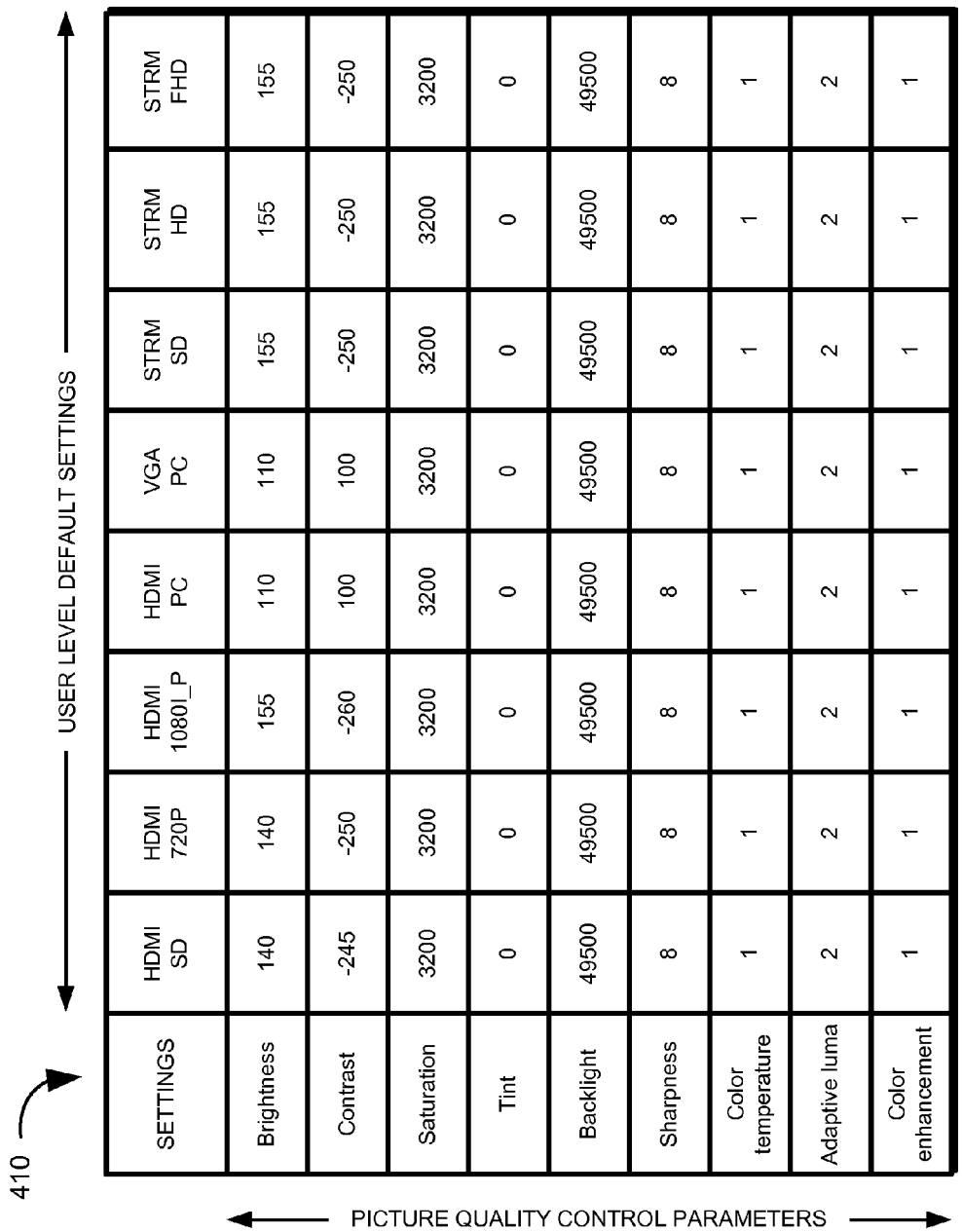

FIG. 4B is a table that illustrates the mapping of additional user level preset settings to the device level picture quality control parameters described above with respect to FIG. 4A, in accordance with an embodiment of the invention. Referring to FIG. 4B, there is shown a table 410 that presents additional user level settings or operating modes for the user level preset settings as illustrated in the top row of the table 410. For example, a user or manufacturer may be able to select one of the following additional settings as a user level default setting: an HDMI SD source, an HDMI 720P, an HDMI 1080I_P, an HDMI PC, a VGA PC, a streaming video (STRM) SD, a STRM HD, and a STRM full HD (FHD). These settings may be associated with the picture quality control parameters of the DTV SoC 200 described above with respect to FIG. 4A. Accordingly, the DTV SoC 200 may dynamically modify, adjust, and/or control which of the various picture quality control parameters are mapped to the various additional user level default settings shown in table 410 and/or the value of those picture quality control parameters. Additional details regarding the dynamic modification, adjustment, and/or control of the values and/or mapping of the picture quality control parameters to, for example, the user level default settings, are provided below in connection with at least FIGS. 7A-10.

The tables 400 and 410 described above with respect to FIGS. 4A and 4B, respectively, illustrate default picture settings for different inputs and/or resolutions supported by the DTV SoC 200 and/or the display unit. Fewer or more settings may be available in such tables based on the operation of the DTV SoC 200 and/or on the operation of the display unit. Other presets of the various picture settings illustrated in the tables of FIGS. 4A and 4B may have different values in one or more cells.

FIG. 5 is a table that illustrates a picture quality profile mapping of user level color temperature settings to device level picture quality control parameters, in accordance with an embodiment of the invention. Referring to FIG. 5, there is shown a table 500 for user level color temperature (COLTEMP) settings. A user level color temperature setting may refer to a logical setting that a user may be able to control or set for the operation of a television or display unit based on the characteristics of a light source. The user level color temperature settings may comprise a plurality of user level settings or operating modes as illustrated in the top row of the table 500. For example, the DTV SoC 200 may be utilized to select one ore more of the following settings as the user level color temperature setting: a custom luminance-chrominance (YUV) source, a cool YUV source, a computer YUV source, a normal YUV, a 6500 red-green-blue (RGB) source, a 9300 RGB source, and a custom RGB source.

For each of the settings described above, the DTV SoC 200 may have one or more associated physical or device level picture quality control parameters. Each of these picture quality control parameters may be set to a particular or default value during manufacturing or during the initial configuration of the DTV SoC 200. As shown in table 500, each of the settings described above is associated with the following picture quality control parameters of the DTV SoC 200: a red channel gain (rGain), a green channel gain (gGain), a blue channel gain (bGain), a red channel offset (rOffset), a green channel offset (gOffset), a blue channel offset (bOffset), and a gamma index (Gamma_idx). As indicated above, the values of the picture quality control parameters typically remain set after manufacturing or after the initial configuration of the DTV SoC 200. For example, whether by user selection or as a default value, any time the Custom YUV setting is selected, the rGain value is 2048 and the Gamma_idx value is 3. The DTV SoC 200, however, may be operable to have such set value dynamically modified, adjusted, and/or controlled based on having a picture quality profile received by the DTV SoC 200. Moreover, the DTV SoC 200 may be operable to dynamically modify, adjust, and/or control which of the various picture quality control parameters are mapped to the various user level color temperature settings shown in table 500. Additional details regarding the dynamic modification, adjustment, and/or control of the values and/or mapping of the picture quality control parameters to, for example, the user level color temperature settings, are provided below in connection with at least FIGS. 7A-10.

FIG. 6 is a table that illustrates a picture quality profile mapping of user level picture ranges settings to device level picture quality control parameters, in accordance with an embodiment of the invention. Referring to FIG. 6, there is shown a table 600 for user level picture range (PICRANGE) settings. A user level picture range setting may refer to a logical setting that a user may be able to control or set for the range of certain parameters for the operation of a television or display unit. The user level picture range setting may comprise a plurality of exemplary user level settings or operating modes as illustrated in the top row of the table 600. For example, the DTV SoC 200 may be utilized to select one or more of the following settings as the user level picture range setting: tint, contrast, saturation, brightness, backlight, sharpness, red gain (Rgain), green gain (Ggain), blue gain (Bgain), red offset (Roffset), green offset (Goffset), and blue offset (Boffset).

For each of the exemplary settings described above, the DTV SoC 200 may have one or more associated physical or device level picture quality control parameters. Each of these picture quality control parameters may be set to a particular or default value during manufacturing or during the initial configuration of the DTV SoC 200. As shown in table 600, each of the settings described above is associated with the following picture quality control parameters of the DTV SoC 200: a logic range minimum (logic_min), a logic midrange (logic_mid), a logic range maximum (logic_max), a physical range minimum (phy_min), a physical mid-range (phy_mid), and a physical range maximum (phy_max). As indicated above, the values of the picture quality control parameters typically remain set after manufacturing or after the initial configuration of the DTV SoC 200. For example, whether by user selection or as a default value, any time the Brightness setting is selected, the logic_mid value may be 50 and the phy_mid value is 2300. The DTV SoC 200, however, may be operable to have such set value dynamically modified, adjusted, and/or controlled based on having a picture quality profile received by the DTV SoC 200. Moreover, the DTV SoC 200 may be operable to dynamically modify, adjust, and/or control which of the various picture quality control parameters are mapped to the various user level picture range settings shown in table 600. Additional details regarding the dynamic modification, adjustment, and/or control of the values and/or mapping of the picture quality control parameters to, for example, the user level picture range settings, are provided below in connection with at least FIGS. 7A-10.

In addition to the various mappings of user level settings to the device level picture quality control parameters of the DTV SoC 200 described above, other picture quality parameters may be considered as well. For example, a frame rate converter (FRC) indicator may be utilized to control aspects of one or more of compression, video format conversion, quality enhancement, and the like, which may be performed by the DTV SoC 200. In another example, when certain scenes or groups of scenes are be best viewed in 3D video format or in a two-dimensional (2D) video format, a 3D/2D indicator may be utilized to control that the appropriate scenes be provided in the appropriate video format by the DTV SoC 200. In each of these examples, one or more user level settings may be mapped to one or more device level picture quality control parameters to enable the use of FRC and/or 3D/2D picture quality parameters.

The various mappings of user level settings to the device level picture quality control parameters of the DTV SoC 200 described above are given by way of examples and not of limitations. Other values and/or mapping of the device level picture quality control parameters to user level settings may be considered in various embodiments of the invention.

Figure 7A:
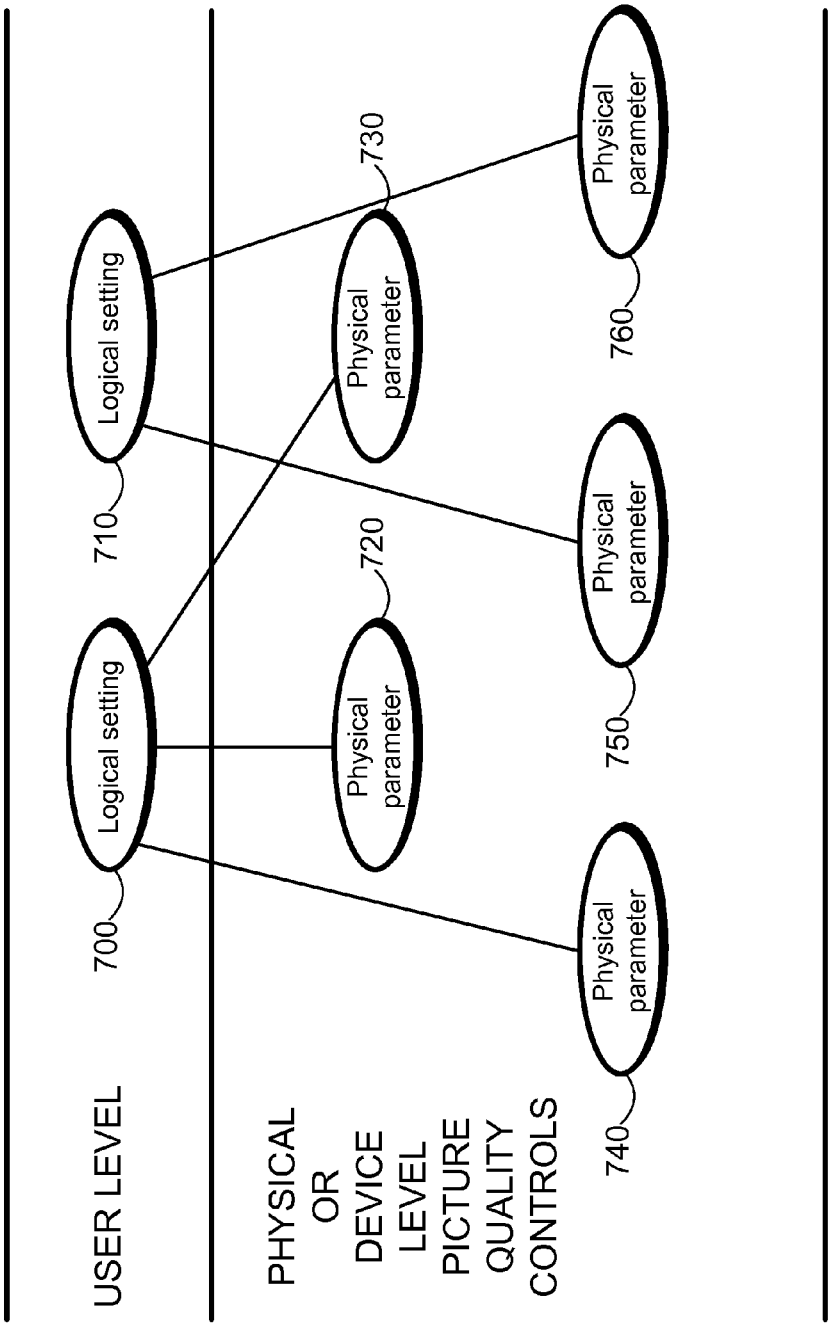
FIGS. 7A-7D are each a diagram that illustrates a modification to a picture quality profile mapping of user level settings to device level picture quality control parameters, in accordance with an embodiment of the invention.

FIG. 7A is a diagram that illustrates a picture quality profile mapping of user level settings to device level picture quality control parameters, in accordance with an embodiment of the invention. Referring to FIG. 7A, there is shown, at the user level, a logical setting 700 and a logical setting 710, and at the device level picture quality control level, physical parameters 720, 730, 740, 750, and 760. The logical settings 700 and 710 may be user level settings that a user has the ability to vary or select via a graphical user interface, for example. The mapping or relationship between the user level logical settings 700 and 710 and the physical or device level picture quality control parameters 720, 730, 740, 750, and 760 of the DTV SoC 200 may be set at fabrication and/or at the initialization of the DTV SoC 200. In the embodiment of the invention illustrated in FIG. 7A, the logical setting 700 may be mapped to physical parameters 720, 730, and 740 in the DTV SoC 200. That is, when the logical setting 700 is set or selected, the corresponding values of the physical parameters 720, 730, and 740 may be utilized by the DTV SoC 200 in connection with one or more operations associated with the logical setting 700. Similarly, the logical setting 710 may be mapped to physical parameters 750 and 760 in the DTV SoC 200. Accordingly, when the logical setting 710 is set or selected, the values of the physical parameters 750 and 760 may be utilized by the DTV SoC 200 in connection with one or more operations associated with the logical setting 710.

Figure 7B:
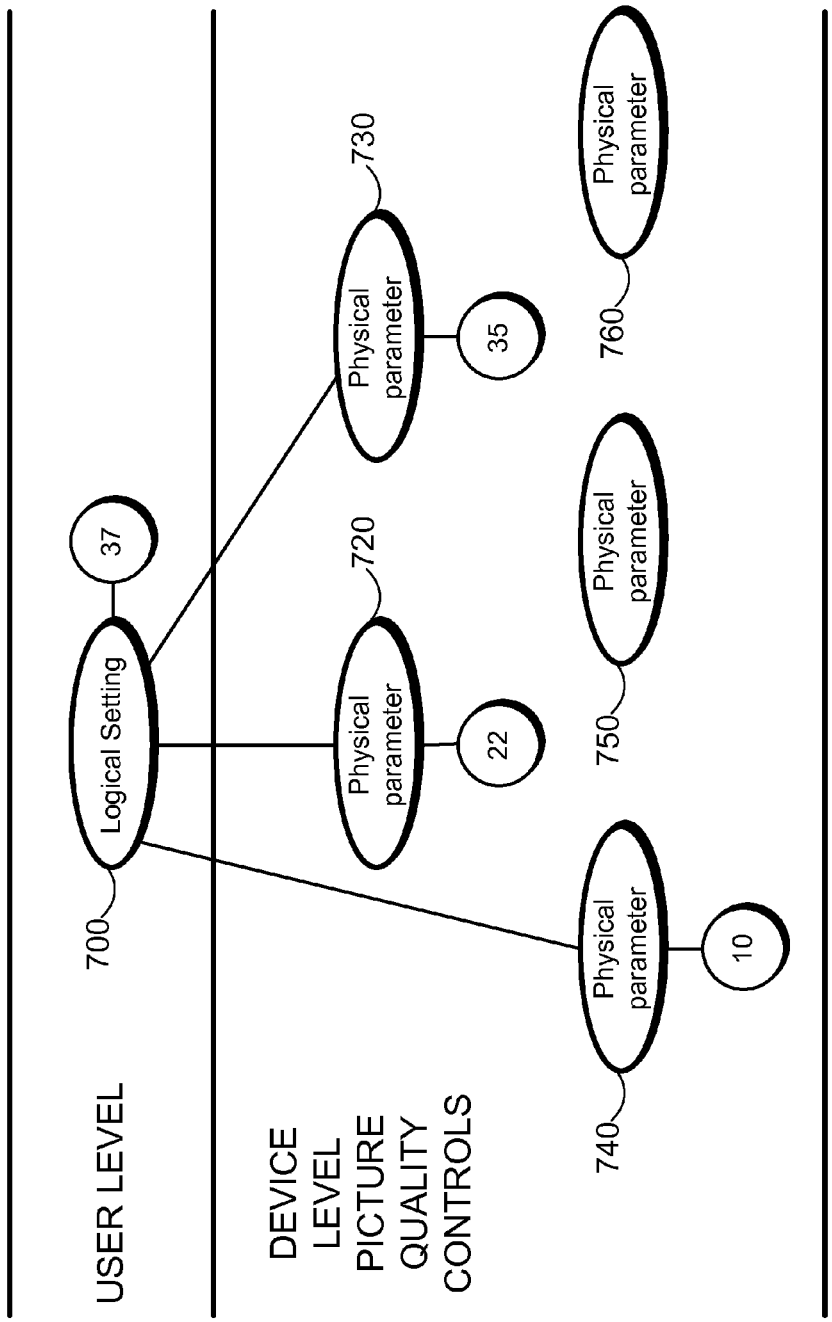

FIG. 7B is a diagram that illustrates an exemplary picture quality profile mapping of a user level setting to a plurality of device level picture quality control parameters, in accordance with an embodiment of the invention. Referring to FIG. 7B, the logical setting 700 is shown, for purposes of illustration, to have a value of 37. Such value may be a default value or one chosen by a user through a graphical user interface, for example. For example, the value 37 may have been selected by a user through a sliding bar or other like display graphic. In another example, the user may select a particular setting or mode of a plurality of logical user level settings, wherein such selected setting or mode has a default value of 37. Because the logical setting 700 is mapped to the physical parameters 720, 730, and 740, a value of 37 for the logical setting 700 maps to or corresponds to values of 22, 35, and 10 for the physical parameters 720, 730, and 740, respectively. These values are then utilized by the DTV SoC 200 in connection with one or more operations associated with the logical setting 700.

Figure 7C:
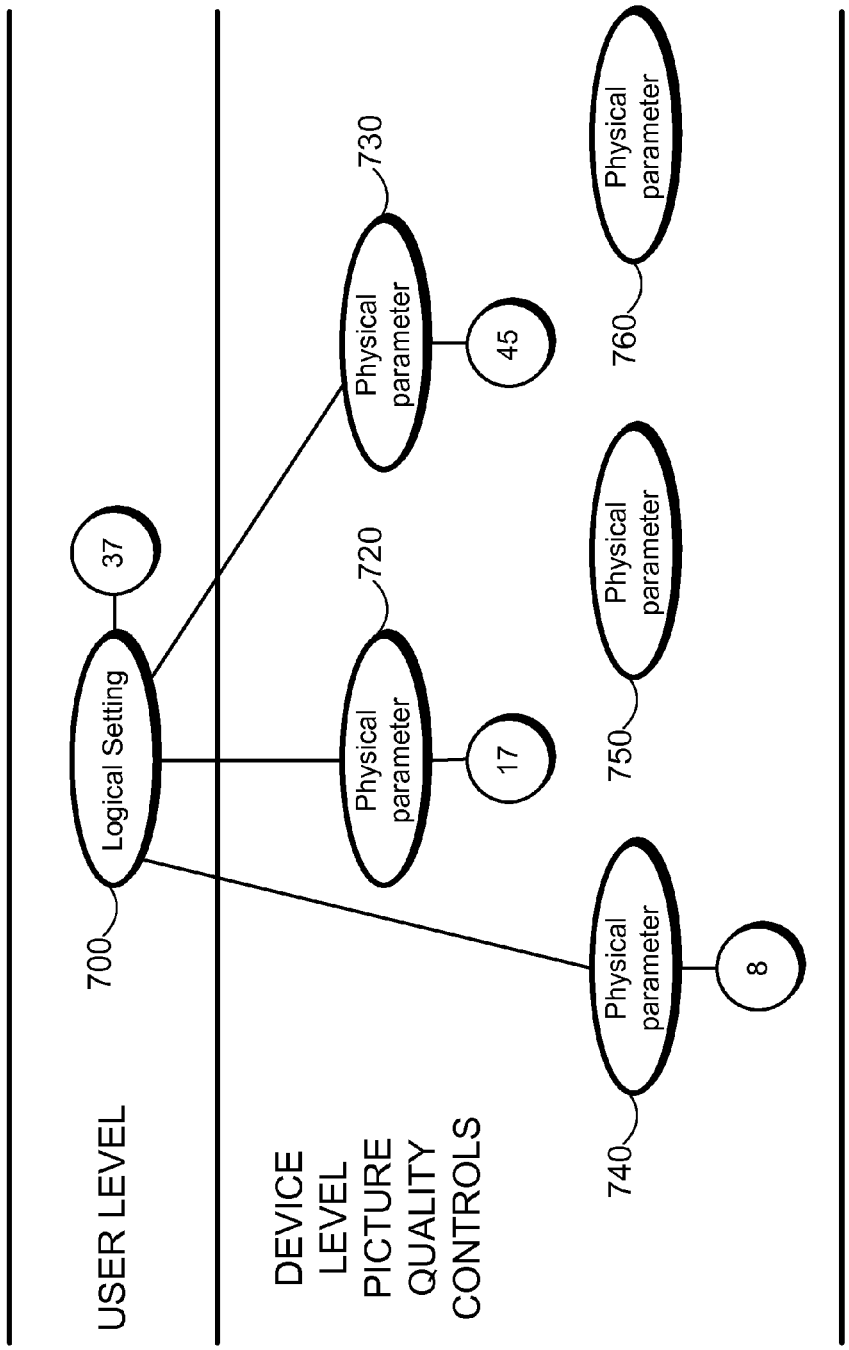

FIG. 7C is a diagram that illustrates an exemplary modification of the values of the picture quality control parameters based on a received picture quality profile, in accordance with an embodiment of the invention. Referring to FIG. 7C, the logical setting 700 is again shown to have a value of 37. In this instance, however, the DTV SoC 200 may have received a picture quality profile from a server, for example, that enables the DTV SoC 200 to dynamically modify, adjust, and/or control the values of the picture quality control parameters such that the processing of a current video channel provides a particular viewing experience to the user. The new values of the physical parameters 720, 730, and 740 are 17, 45, and 8, respectively, while the value of the logical setting 700 has not changed. That is, the change in value of the physical parameters 720, 730, and 740 is hidden from the user as the logical setting 700 maintains a value of 37. In other words, a value of 37 for the logical setting 700 corresponds to different physical parameter values, which when utilized by the DTV SoC 200, provide a different viewing experience than that provided by the previous set of physical parameter values.

Figure 7D:
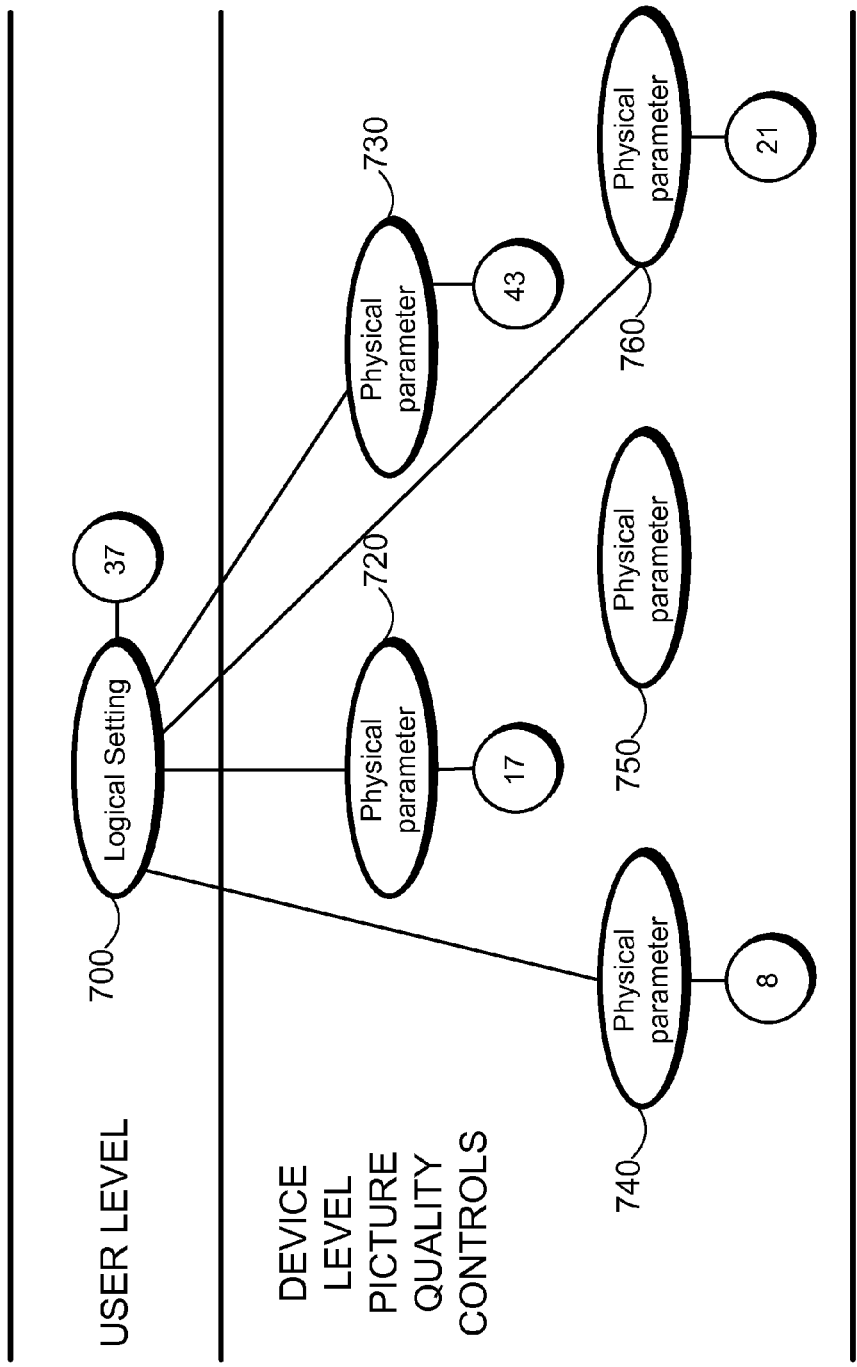

FIG. 7D is a diagram that illustrates an exemplary modification of the values and the mapping of the picture quality control parameters based on a received picture quality profile, in accordance with an embodiment of the invention. Referring to FIG. 7D, the logical setting 700 is again shown to have a value of 37. In this instance, however, the DTV SoC 200 received a picture quality profile from a server, for example, that enables the DTV SoC 200 to dynamically modify, adjust, and/or control the values and the mapping of the picture quality control parameters such that the processing of a current video channel provides a particular viewing experience to the user. While the value of physical parameters 720 and 740 remain the same, a new value of physical parameter 730 is 43. Moreover, the logical setting 700 is now shown to be mapped or correspond to physical parameter 760, to which it was not mapped before. In this instance, the physical parameter 760 has a value of 21. Both the mapping of the logical setting 700 to the physical parameter 760 and the value of the physical parameter 760 may be determined from the picture quality profile received by the DTV SoC 200. The new mapping and physical parameter values are then utilized by the DTV SoC 200 in connection with one or more operations associated with the logical setting 700.

Figure 8:
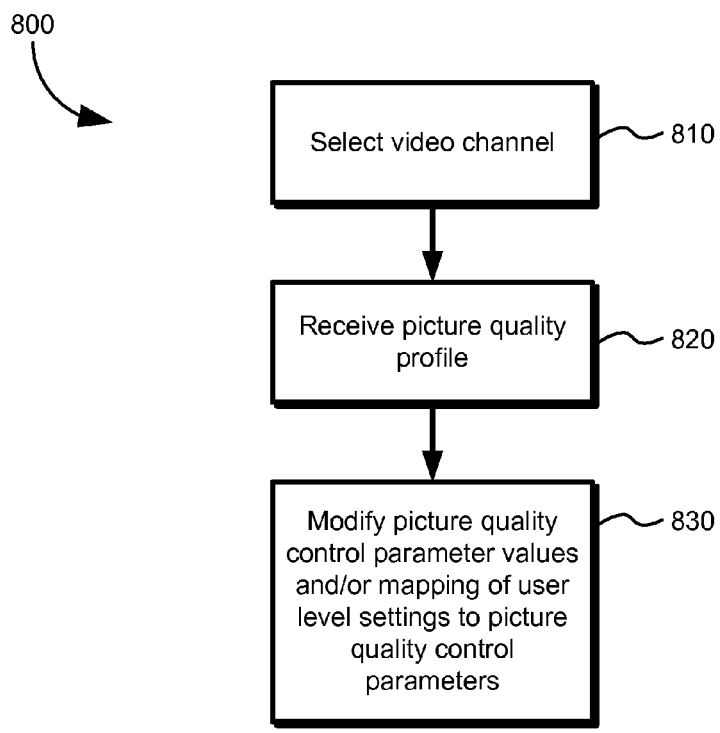
FIG. 8 is a flow chart that illustrates steps for modifying picture quality control parameters, in accordance with an embodiment of the invention.

FIG. 8 is a flow chart that illustrates steps for modifying picture quality control parameters, in accordance with an embodiment of the invention. Referring to FIG. 8, there is shown a flow chart 800 in which, at step 810, a video processor, such as the DTV SoC 200, for example, may select a video channel from a plurality of video channels received by the video processor. The video processor may be comprised within a television or display device such as the display unit 100 described above with respect to FIG. 1. At step 820, during the processing of the selected video channel to display and/or reproduce its video content, the video processor may receive a picture quality profile. At step 830, the video processor may utilize the picture quality profile to dynamically modify, adjust, and/or control one or more device level picture quality control parameters that may be utilized by the video processor to process the contents of the video channel. For example, the picture quality profile may comprise information regarding one or more logical settings and may also comprise information regarding the mapping and/or value of one or more device level picture quality control parameters that correspond to the one or more logical settings. The video processor may modify the mapping and/or the value of the device level picture quality control parameters that are utilized in connection with the logical settings in the picture quality profile to change the processing of the contents of the video channel and provide the user with a different viewing experience.

Figure 9:
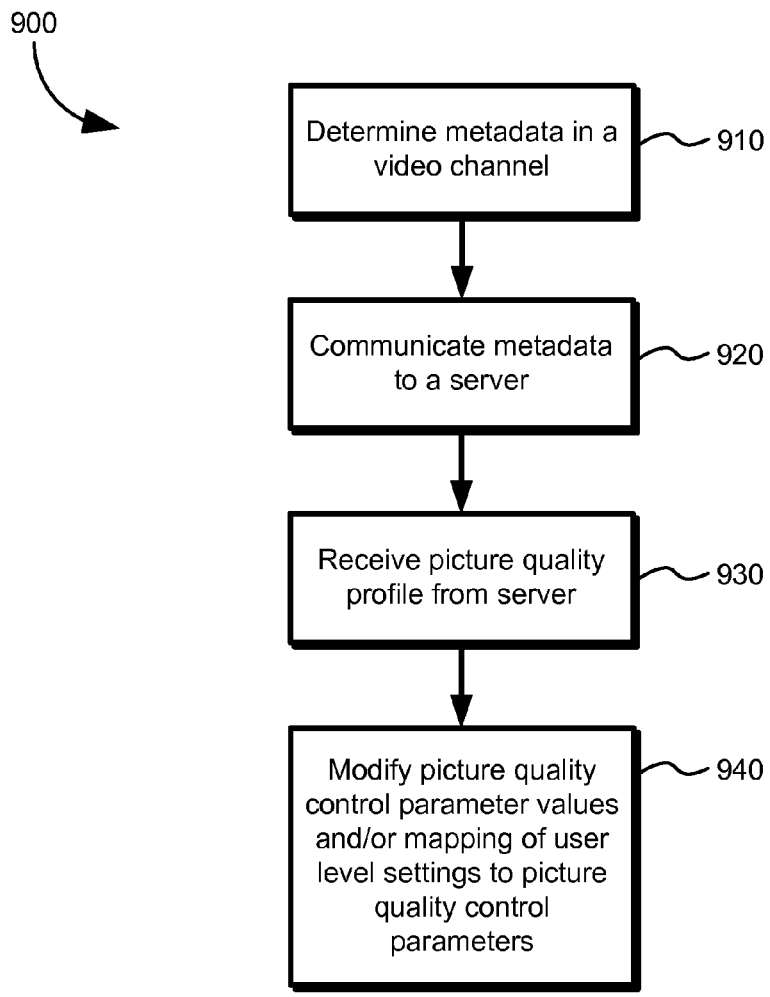
FIG. 9 is a flow chart that illustrates steps for content-based modification of picture quality control parameters, in accordance with an embodiment of the invention.

FIG. 9 is a flow chart that illustrates steps for content-based modification of picture quality control parameters, in accordance with an embodiment of the invention. Referring to FIG. 9, there is shown a flow chart 900 in which, at step 910, a video processor, such as the DTV SoC 200, for example, may determine metadata in a video channel received by the DTV SoC 20. The metadata may indicate timing and/or content information associated with, for example, the television programming being currently provided in the video channel. At step 920, the video processor and/or another device in a television or display device may be utilized to communicate the metadata to a server, such as the server 150 described above with respect to FIG. 1. The server may receive the metadata and may determine, select, and/or create an appropriate picture quality profile that corresponds to the metadata received.

At step 930, during the processing of the video channel to display and/or reproduce its video content, the video processor may receive a picture quality profile from the server. At step 940, the video processor may utilize the picture quality profile to dynamically modify, adjust, and/or control one or more device level picture quality control parameters that may be utilized by the video processor to process the contents of the video channel. The video processor may modify the mapping and/or the value of the device level picture quality control parameters that are utilized in connection with the logical settings in the picture quality profile to change the processing of the contents of the video channel and provide the user with a different viewing experience.

Figure 10:
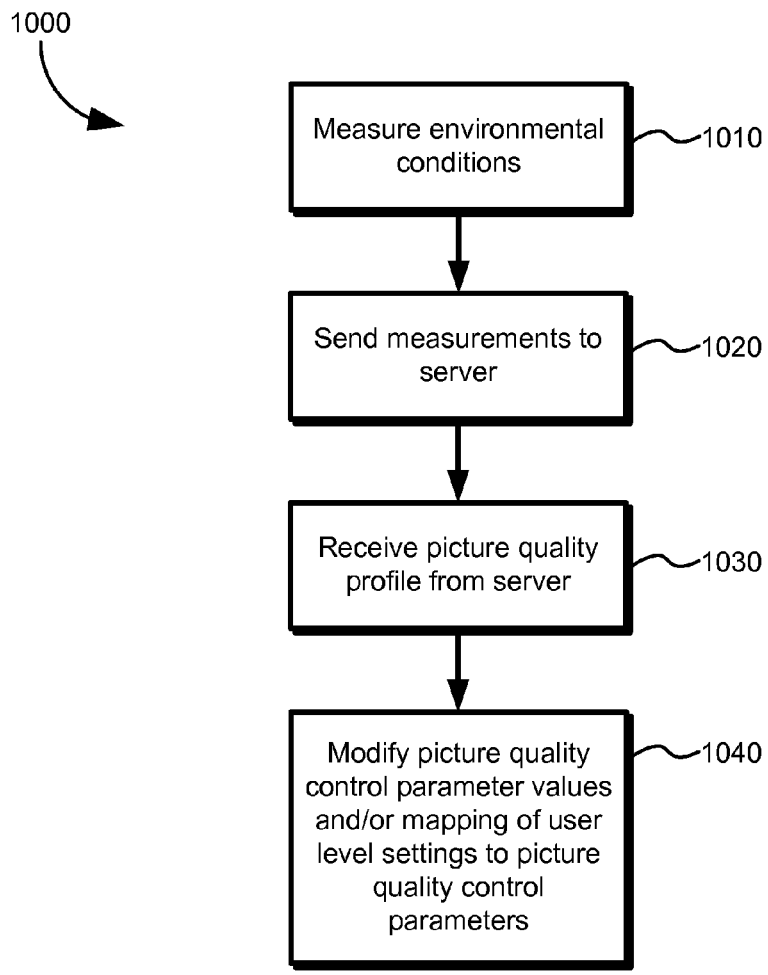
FIG. 10 is a flow chart that illustrates steps for utilizing environmental measurements to modify picture quality control parameters, in accordance with an embodiment of the invention.

FIG. 10 is a flow chart that illustrates steps for utilizing environmental measurements to modify picture quality control parameters, in accordance with an embodiment of the invention. Referring to FIG. 10, there is shown a flow chart 100 in which, at step 1010, one or more sensors, such as the sensors 104a, 104b, . . . , 104n, described above with respect to FIG. 1, may make one or more measurements of environmental conditions at and/or near a television or display unit. At step 1020, a video processor, such as the DTV SoC 200, for example, and/or another device in a television or display unit may be utilized to communicate the measured environmental conditions to a server, such as the server 150 described above with respect to FIG. 1. The server may receive the measured environmental conditions and may determine, select, and/or create an appropriate picture quality profile that corresponds to the measured environmental conditions received. Moreover, the server may make such determination, selection, and/or creation based on received metadata.

At step 1030, during the processing of a video channel to display and/or reproduce its video content, the video processor may receive a picture quality profile from the server. At step 1040, the video processor may utilize the picture quality profile to dynamically modify, adjust, and/or control one or more device level picture quality control parameters that may be utilized by the video processor to process the contents of the video channel. The video processor may modify the mapping and/or the value of the device level picture quality control parameters that are utilized in connection with the logical settings in the picture quality profile to change the processing of the contents of the video channel and provide the user with a different viewing experience.

In an embodiment of the invention, a method for processing content in a video may comprise selecting a video channel from a plurality of video channels received by the DTV SoC 200 described above with respect to FIG. 2. The selection may be performed by, for example, the interface module 202 of the DTV SoC 200. The DTV SoC 200 may receive a picture quality profile associated with a content of the selected video channel. The picture quality profile may be received from the server 150, for example, and may be stored locally on the DTV SoC 200 and/or in the memory module 250 to be accessed by the DTV SoC 200. The DTV SoC 200 may modify, based on the received picture quality profile, a value of one or more picture quality control parameters utilized by the interface module 202, the audio module 204, the video module 206, and/or the core processor module 208 of the DTV SoC 200, and which are mapped to a user level setting. The modification described above may comprise modifying the mapping of the user level setting to the picture quality control parameters utilized by the DTV SoC 200. In an example, the user level setting may comprise a user level noise reduction setting. The picture quality control parameters utilized by the DTV SoC 200 that are mapped to the user level noise reduction setting may comprise an analog noise reduction level, a block noise reduction level, a mosquito noise reduction level, and/or a digital contour reduction level. In another example, the user level setting may comprise a user level preset setting. The picture quality control parameters utilized by the DTV SoC 200 that are mapped to the user level preset setting may comprise a brightness level, a contrast level, a saturation level, a tint level, a backlight level, a sharpness level, a luma level, and a color enhancement level.

The DTV SoC 200 may receive measured environmental conditions associated with a display device such as the display unit 100, for example. The DTV SoC 200 may communicate, send, and/or transfer the measured environmental conditions to the server 150 or other like device and/or service, wherein the picture quality profile associated with the content of the selected video channel is determined by the server 150 based on the measured environmental conditions received from the DTV SoC 200. The DTV SoC 200 may format the measured environmental conditions before communicating them to the server 150. The measured environmental conditions may include light measurements (e.g., lighting level, lighting distribution), sound measurements (e.g., voice, audio noise), motion measurements (e.g., user presence detection), and/or temperature measurements (e.g., room temperature).

The DTV SoC 200 may determine, utilizing the audio module 204, the video module 206, and/or the core processor module 208, metadata associated with the content of the selected video channel. The DTV SoC 200 may communicate the determined metadata to the server 150, wherein the picture quality profile associated with the content of the selected video channel may be determined by the server 150 based on the determined metadata and/or based on the measured environmental conditions received by the server 150.

The DTV SoC 200 may detect when a change in the content of the selected video channel occurs. In this regard, the DTV SoC 200 may be monitoring the content of the selected to detect a particular event or one of several particular events. Moreover, the DTV SoC 200 may monitor the content of the selected video channel to detect a particular type of metadata or one or several particular types of metadata that are =received with the content of the selected video channel. The DTV SoC 200 may receive a subsequent picture quality profile associated with the detected content change of the selected video channel from the server 150, and may modify, based on the received subsequent picture quality profile, a value of one or more of the picture quality control parameters utilized by the DTV SoC 200. The modifying described above may comprise modifying, based on the received subsequent picture quality profile, the mapping of the user level setting to the picture quality control parameters utilized by the DTV SoC 200. In other words, the DTV SoC 200 may dynamically modify the picture quality profile, that is, the values and/or mapping of the picture quality control parameters, which is being utilized in connection with the processing of certain content of the selected video channel based on the changes in such content.

Another embodiment of the invention may provide a non-transitory machine and/or computer readable storage and/or medium, having stored thereon, a machine code and/or a computer program having at least one code section executable by a machine and/or a computer, thereby causing the machine and/or computer to perform the steps as described herein for applying content-based picture quality profiles to a television or other display device.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
    selecting, by a video processor, a video channel from a plurality of video channels received by said video processor;
    receiving, by said video processor, a picture quality profile associated with a content of said selected video channel; and
    adjusting, by said video processor and based on said received picture quality profile, a mapping of a user level setting from a first one or more picture quality control parameters to a second one or more picture quality control parameters utilized by said video processor, each of the first and second one or more picture quality control parameters comprising a value.

2. The method of claim 1, wherein receiving said picture quality profile further comprises receiving said picture quality profile associated with said content of said selected video channel from a server.

3. The method of claim 1, further comprising modifying, based on said received picture quality profile, the value of said second one or more picture quality control parameters utilized by said video processor.

4. The method of claim 1, further comprising:
    receiving by said video processor, measured environmental conditions associated with a display device; and
    communicating said measured environmental conditions to a server, wherein said picture quality profile associated with said content of said selected video channel is determined by said server based on said measured environmental conditions.

5. The method of claim 4, wherein said measured environmental conditions comprise one or more of an ambient light measurement, a sound measurement, a motion measurement, and a temperature measurement.

6. The method of claim 1, further comprising:
    determining metadata associated with said content of said selected video channel; and
    communicating said determined metadata to a server, wherein said picture quality profile associated with said content of said selected video channel is determined by said server based on said determined metadata.

7. The method of claim 1, further comprising:
    detecting a change in said content of said selected video channel;
    receiving by said video processor, a subsequent picture quality profile associated with said detected content change of said selected video channel; and
    modifying, based on said received subsequent picture quality profile, the value of the first or second one or more picture quality control parameters utilized by said video processor that are mapped to said user level setting.

8. The method of claim 7, further comprising modifying, based on said received subsequent picture quality profile, said mapping of said user level setting to said second one or more picture quality control parameters utilized by said video processor.

9. The method of claim 1, wherein:
    said user level setting comprises a user level noise reduction setting; and
    said first or second one or more picture quality control parameters utilized by said video processor that are mapped to said user level noise reduction setting comprise one or more of:
    an analog noise reduction level;
    a block noise reduction level;
    a mosquito noise reduction level; and
    a digital contour reduction level.

10. The method of claim 1, wherein:
    said user level setting comprises a user level preset setting; and
    said first or second one or more picture quality control parameters utilized by the video processor that are mapped to said user level preset setting comprise one or more of:
    a brightness level;
    a contrast level;
    a saturation level;
    a tint level;

a backlight level;
a sharpness level;
a luma level; and
a color enhancement level.

11. A system, comprising:
a video processor that is operable to select a video channel from a plurality of video channels received by said video processor;
said video processor being operable to receive a picture quality profile associated with a content of said selected video channel; and
said video processor being operable to modify, based on said received picture quality profile, a mapping of a user level setting from a first one or more picture quality control parameters to a second one or more picture quality control parameters utilized by said video processor, each of the first and second one or more picture quality control parameters comprising a value.

12. The system of claim 11, wherein said video processor is operable to receive said picture quality profile associated with said content of said selected video channel from a server.

13. The system of claim 11, wherein said video processor is operable to modify, based on said received picture quality profile, the value of said second one or more picture quality control parameters utilized by said video processor.

14. The system of claim 11, comprising:
said video processor is operable to receive measured environmental conditions associated with a display device; and
said video processor is operable to communicate said measured environmental conditions to a server, wherein said picture quality profile associated with said content of said selected video channel is determined by said server based on said measured environmental conditions.

15. The system of claim 14, wherein said measured environmental conditions comprise one or more of an ambient light measurement, a sound measurement, a motion measurement, and a temperature measurement.

16. The system of claim 11, wherein said video processor is operable to:
determine metadata associated with said content of said selected video channel; and
communicate said determined metadata to a server, wherein said picture quality profile associated with said content of said selected video channel is determined by said server based on said determined metadata.

17. The system of claim 11, wherein the video processor is operable to:
detect a change in said content of said selected video channel;
receive a subsequent picture quality profile associated with said detected content change of said selected video channel; and
modify, based on said received subsequent picture quality profile, the value of the first or second one or more picture quality control parameters utilized by said video processor that are mapped to said user level setting.

18. The system of claim 17, wherein said video processor is operable to modify, based on said received subsequent picture quality profile, said mapping of said user level setting to said plurality of picture quality control parameters utilized by the video processor.

19. The system of claim 11, wherein:
said user level setting comprises a user level noise reduction setting; and
said first or second plurality of picture quality control parameters utilized by said video processor that are mapped to said user level noise reduction setting comprise one or more of:
an analog noise reduction level;
a block noise reduction level;
a mosquito noise reduction level; and
a digital contour reduction level.

20. The system of claim 11, wherein:
said user level setting comprises a user level preset setting; and
said first or second plurality of picture quality control parameters utilized by said video processor that are mapped to said user level preset setting comprise one or more of:
a brightness level;
a contrast level;
a saturation level;
a tint level;
a backlight level;
a sharpness level;
a luma level; and
a color enhancement level.

* * * * *